US007889885B2

(12) United States Patent
Cordery et al.

(10) Patent No.: US 7,889,885 B2
(45) Date of Patent: Feb. 15, 2011

(54) METHOD FOR DETECTING PERFORATIONS ON THE EDGE OF AN IMAGE OF A FORM

(75) Inventors: Robert A Cordery, Danbury, CT (US); Matthew J Campagna, Ridgefield, CT (US); Thomas J Foth, Trumbull, CT (US); Bertrand Haas, New Haven, CT (US); Douglas B Quine, Bethel, CT (US)

(73) Assignee: Pitney Bowes Inc., Stamford, CT (US)

( * ) Notice: Subject to any disclaimer, the term of this patent is extended or adjusted under 35 U.S.C. 154(b) by 1341 days.

(21) Appl. No.: 11/286,634

(22) Filed: Nov. 23, 2005

(65) Prior Publication Data

US 2007/0116349 A1    May 24, 2007

(51) Int. Cl.
  G06K 9/00    (2006.01)
  G06K 9/36    (2006.01)
  G06K 9/74    (2006.01)
  H04N 9/47    (2006.01)
  H04N 7/18    (2006.01)
(52) U.S. Cl. .................. 382/101; 382/135; 382/137; 382/141; 382/280; 356/71; 209/900; 348/150
(58) Field of Classification Search ......... 382/100–101, 382/135, 137, 280; 348/150; 209/900; 356/71
See application file for complete search history.

(56) References Cited

U.S. PATENT DOCUMENTS 4,876,731 A    10/1989 Loris et al.
5,530,772 A *  6/1996 Storey ........................ 382/135
5,818,976 A * 10/1998 Pasco et al. ................. 382/289
5,975,583 A * 11/1999 Cobben et al. ................ 283/93

(Continued)

FOREIGN PATENT DOCUMENTS

DE    3628353 A1    8/1986

(Continued)

OTHER PUBLICATIONS

Fragoulis and Avaritsiotis, "A Siren Detection based on Mechanical Resonant Filters", Sensors, ISSN 14248220, Sep. 2001, vol. 1, Issue 4, pp. 121-137.*

Primary Examiner—Vu Le
Assistant Examiner—Nathan Bloom
(74) Attorney, Agent, or Firm—Steven J. Shapiro; Charles R. Malandra, Jr.

(57) ABSTRACT

A method for detecting whether perforations are present on the edge of an image of a form, such as a check, includes obtaining a bitmap of the image, identifying a selected portion of the bitmap that corresponds to at least the edge and that includes a matrix of a plurality of rows and columns of brightness values, and selecting a particular one of the rows of brightness values. The method further includes performing a Fourier transform of the brightness values included in the particular selected row to generate a Fourier transform output, and determining whether a series of perforations is present based on the Fourier transform output. The method may also include steps wherein the brightness values are low pass filtered and wherein the values in the selected row are high pass filtered prior to the step of performing a Fourier transform.

16 Claims, 4 Drawing Sheets

U.S. PATENT DOCUMENTS

| | | | |
|---|---|---|---|
| 2001/0055409 A1 | 12/2001 | Shiratsuchi et al. | 382/101 |
| 2002/0069220 A1* | 6/2002 | Tran | 707/503 |
| 2003/0152259 A1* | 8/2003 | Belykh et al. | 382/132 |
| 2008/0159615 A1* | 7/2008 | Rudaz et al. | 382/137 |

FOREIGN PATENT DOCUMENTS

| | | |
|---|---|---|
| EP | 0 278 058 A1 | 10/1987 |
| WO | 2004/011274 A1 | 2/2004 |

* cited by examiner

METHOD FOR DETECTING PERFORATIONS ON THE EDGE OF AN IMAGE OF A FORM

FIELD OF THE INVENTION

The present invention relates to optical detection systems and in particular to a method for detecting perforations on the edge of an image of a form such as a check.

BACKGROUND OF THE INVENTION

Traditionally, businesses have deposited checks received from, for example, customers by physically taking them to a branch of their bank and depositing them over the counter with a teller or dropping them into a night deposit box. The actual physical presentation of checks to be deposited was necessary because, under prior banking laws, the depository bank had to present the original of each check to the corresponding paying bank in order to clear the check. This changed in October of 2004 with the enactment of The Check Clearing for the 21$^{st}$ Century Act, commonly referred to Check 21. Check 21 removed the legal requirement that an original paper check had to be presented to obtain payment. Instead, banks can now use digital images to transport check data from the bank of first deposit to the paying bank. If the paying bank cannot process a check image, the image can be printed, according to certain specifications, to create what is known as a substitute check, which is the legal equivalent of the original paper check. Check 21 has thus opened the door for remote check deposit solutions wherein check images, rather than original paper checks, are used to make deposits, thereby enabling businesses to eliminate trips to the bank. In addition, the use of check images also reduces check transportation costs among banks and improves funds availability.

For obvious reasons, such as to prevent fraud, it is important to be able to authenticate check images at various points in the banking system. One helpful indicator of check authenticity is the presence of perforations on an edge of the check. The presence of perforations is an indication that a check was likely removed from a checkbook issued by a bank, and is therefore likely authentic. Thus, the ability to detect perforations on an image of a check would be advantageous for banking systems, as the presence of perforations suggests that the image is an image of an authentic check, as opposed to an image created from a copy of a check, which could be fraudulent. Thus, there is a need for a method for detecting the presence of perforations in an image of a check in order to assist in the authentication of check images.

SUMMARY OF THE INVENTION

The present invention relates to various embodiments of a method for detecting whether perforations are present on the edge of an image of a form, such as a check. In a first embodiment, the method includes obtaining a bitmap of the image, identifying a selected portion of the bitmap that corresponds to at least the edge and that includes a matrix of a plurality of rows and columns of brightness values, and selecting a particular one of the rows of brightness values. The method further includes performing a Fourier transform of the brightness values included in the particular selected row to generate a Fourier transform output, and determining whether a series of perforations is present based on the Fourier transform output.

Another embodiment of the method includes obtaining a bitmap of the image, identifying a selected portion of the bitmap that corresponds to at least the edge and that includes a matrix of a plurality of rows and columns of brightness values. The method further includes applying a low pass filter to each of the columns of brightness values to create a second matrix of a plurality of rows and columns of first filtered brightness values, selecting a particular one of the rows of first filtered brightness values, and applying a high pass filter to the particular selected row of first filtered brightness values to create a plurality of high pass filtered brightness values. Finally, the method includes performing a Fourier transform of the high pass filtered brightness values to generate a Fourier transform output, and determining whether a series of perforations is present based on the Fourier transform output. Furthermore, the step of applying a low pass filter may include calculating a plurality of partial sums for each of the columns of brightness values to create a plurality of partial brightness value sums, wherein the partial brightness value sums are the first filtered brightness values.

In either embodiment, the determining step may include identifying a largest peak in the Fourier transform output and determining whether the largest peak corresponds to a perforation indicating frequency. In addition, the brightness values may be grayscale values, or some other scale of values. The selected portion of the bitmap may be less than all of the bitmap, or may be all of the bitmap, depending on the particular implementation Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

As is known in the art, an image of a check or some other form may be represented by a grayscale image or bitmap consisting of a number of rows and columns (a matrix) of dots or pixels in a computer memory wherein the brightness of each dot or pixel is expressed as a value representing it's lightness from black to white. Each dot or pixel is mapped to a specific area of the total image, hence the name bitmap. The brightness in a grayscale image is typically defined as a value from 0 to 255 (an 8 bit scale), with 0 being black and 255 being white. As a result, 256 different shades may be represented.

Perforations appearing on the edge of a form, such as a check, will result in a periodic pattern or variation in the portion of the image corresponding to the edge. According to the present invention, image processing techniques are used to detect variations in an image that are likely to correspond to a series of perforations so that such perforations can be detected in the image. In other words, perforations on an edge of a form will result in a typical varying image structure when an image of the form is created, and, according to the present invention, image processing techniques are used to detect the varying image structure in images in order to detect the presence of perforations. The detected presence of perforations may then be used as an indicator of the authenticity of the check or other form.

Figure 1:
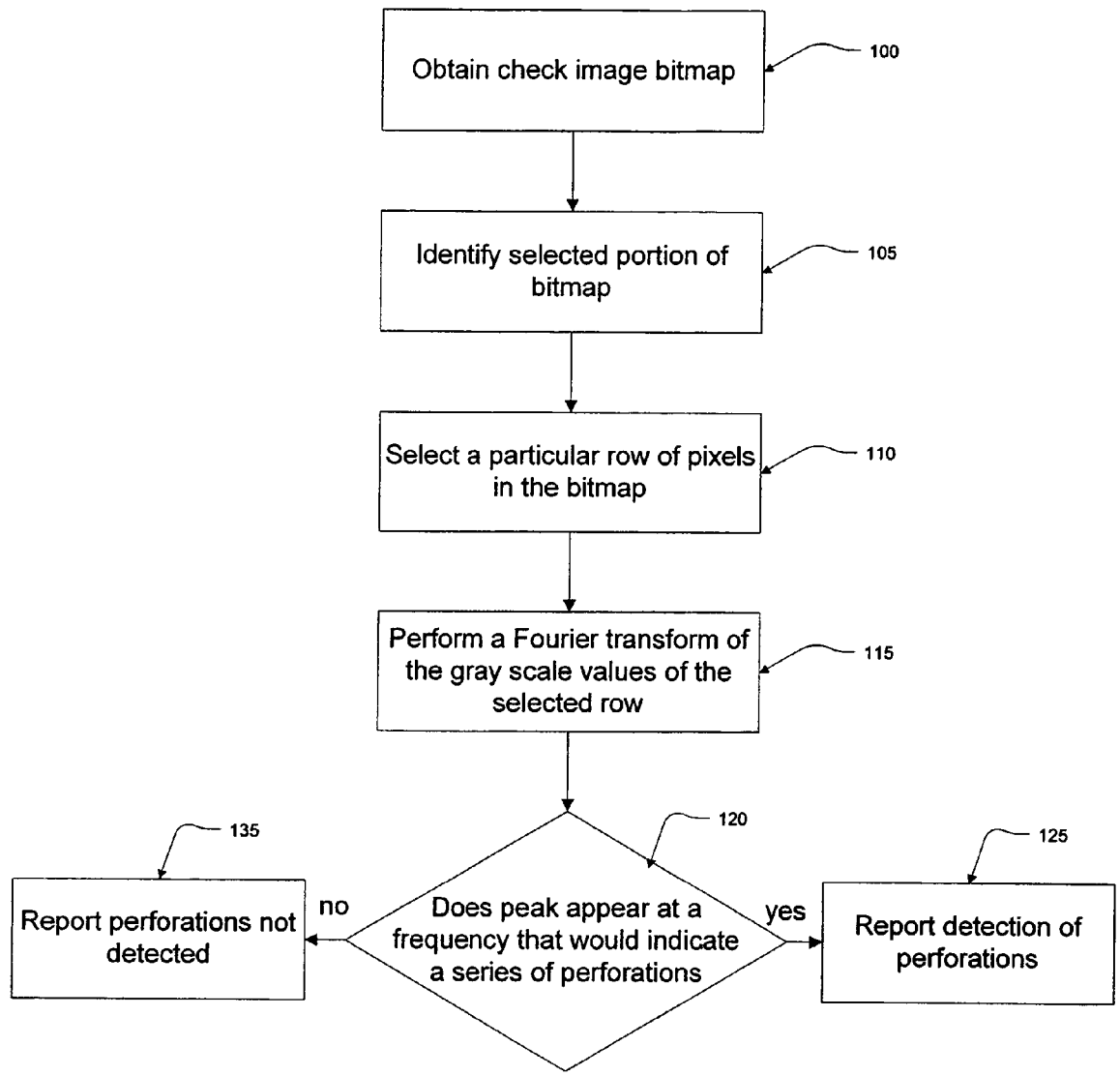
FIG. 1 is a flowchart of a method for detecting perforations on the edge of an image of a check according to a first embodiment of the present invention.

FIG. 1 is a flowchart of a method for detecting perforations on the edge of an image of a check according to a first embodiment of the present invention. The method begins at step 100, where the bitmap corresponding to an image of the check in question is obtained. As will be appreciated, the image will typically include the check and a certain area surrounding the check (i.e., background). At step 105, a selected portion of the bitmap is identified. Preferably, the selected portion of the bitmap is a portion that corresponds to a top portion, e.g., the top quarter inch, of the horizontally oriented check that includes the edge of the check where perforations, if present, would exist plus a portion of the background (i.e., the area surrounding the check above the top edge thereof. Alternatively, the selected portions could include a portion of the image neighboring any edge of the check. Alternatively, the selected portion may include the entire image. As described above, the check image bitmap will consist of a matrix of rows and columns of pixel grayscale values, and the portion selected in step 105 will consist of one or more sub-matrices of the rows and columns of pixel grayscale values.

Next, at step 110, a particular row of pixel grayscale values is selected. According to an aspect of the present invention, the row that is selected in step 110 is a row that is estimated to correspond closely to the top edge of the check. The particular row that is chosen may be determined based on experimentation using a number of bitmap images in any particular application. In one particular embodiment, performance may be improved by providing images that have black backgrounds. This may be accomplished by placing a black piece of paper or the like onto a scanner behind the check to be imaged, and then capturing the image of the check, with result being an image of the check against a black background. In this particular embodiment, the row selected in step 110 may be chosen by identifying the bottom-most row in the matrix that consists essentially of generally black pixels (grayscale value generally equal or close to some minimum value), identifying the top-most row in the matrix that consists essentially of generally white pixels (grayscale value equal or close to some maximum value) and selecting the row approximately half way therebetween. As will be appreciated, the identified bottom-most row will correspond to the beginning of the background just above the edge, and the identified top-most row will correspond to the portion of the check just below where perforations would be present.

Figure 4:
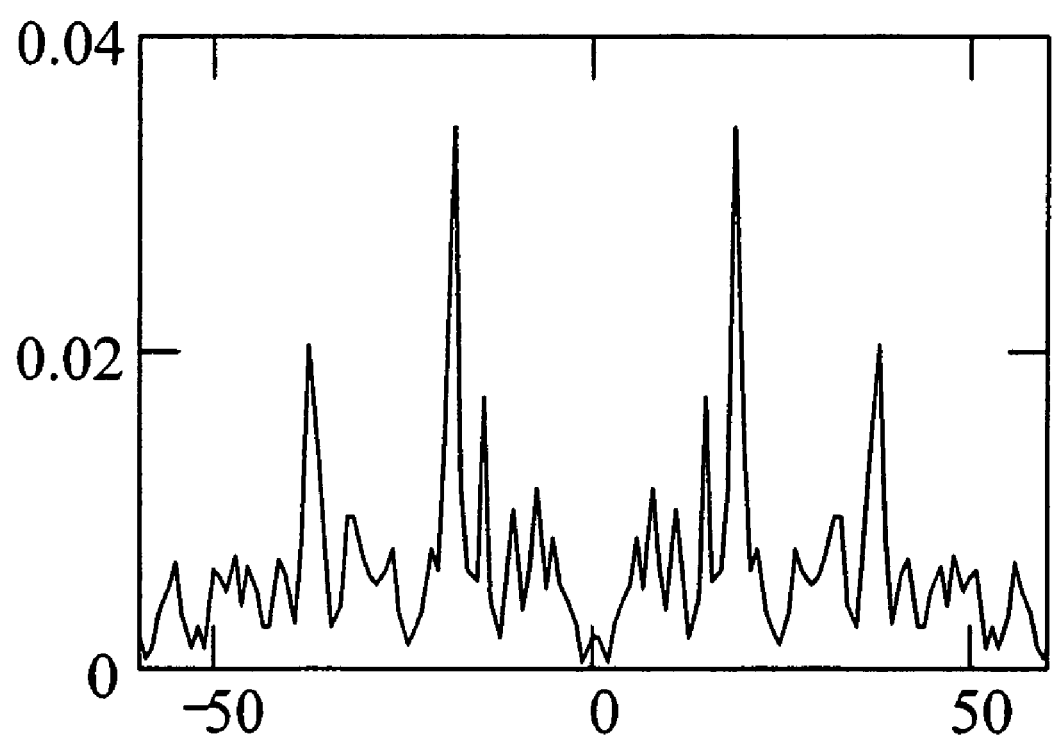
FIG. 4 is an example graph of a Fourier transform output according to an aspect of the present invention.

At step 115, a Fourier transform of the grayscale values of the selected row is performed. As is known in the art, the Fourier transform will convert the row values into an amplitude vs. frequency spectrum. An example of a graph of a Fourier transform output is shown in FIG. 4. Next, at step 120, the largest peak in the Fourier transform spectrum is identified, and a determination is made as to whether the peak appears at a frequency value that would indicate a series of perforations. For example, in a typical check, the perforations may be spaced 0.071 inches apart, which, at a resolution of 200 dpi, corresponds to a frequency of approximately 18.5 pixels per perforation. If the answer at step 120 is yes, then, at step 125, a report may be provided indicating that a series of perforations has been detected. Conversely, if the answer at step 120 is no, then, at step 125, a report may be provided indicating that a series of perforations has not been detected. In either case, the information may be used as an indicator of the authenticity of the check in question.

Figure 2:
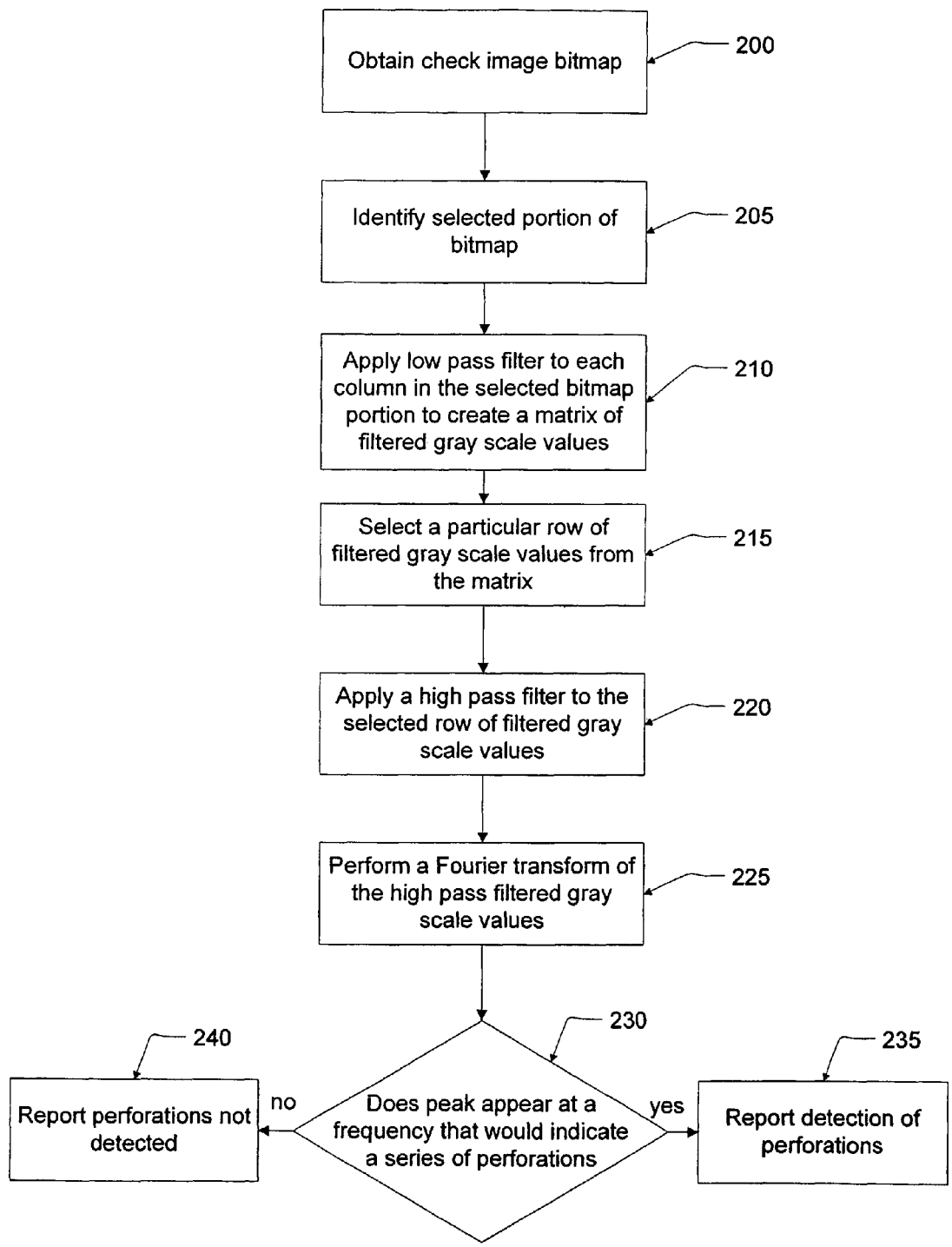
FIG. 2 is a flowchart of a method for detecting perforations on the edge of an image of a check according to a second embodiment of the present invention.

FIG. 2 is a flowchart of a method for detecting perforations on the edge of an image of a check according to a second embodiment of the present invention. The method begins at step 200, where, similar to step 100 of FIG. 1, the bitmap corresponding to an image of the check in question is obtained. At step 205, a selected portion of the bitmap is identified. As was the case in FIG. 1, the selected portion of the bitmap is preferably a portion that corresponds to a top portion of the horizontally oriented check that includes the edge of the check where perforations, if present, would exist plus a portion of the background (i.e., the area surrounding the check above the top edge thereof). Alternatively, the selected portion may include the entire image. The portion selected in step 205 will consist of a sub-matrix of the rows and columns of pixel grayscale values in the image bitmap.

Next, at step 210, a low pass filter is applied to the grayscale values of each of the columns in the selected portion of the bitmap to create a matrix of filtered grayscale values. Then, at step 215, a particular row of the filtered grayscale values from the matrix created in step 210 is selected. As was the case in FIG. 1, the row that is selected in step 215 is a row that is estimated to correspond closely to the top edge of the check, and may be chosen in a manner that is similar to that described in connection with FIG. 1 (i.e., half way between top-most and bottom-most matrix rows determined to have maximum and minimum values, respectively). The particular row that is chosen may be determined based upon experimentation using a number of bitmap images in any particular application.

At step 220, a high pass filter is applied to the selected row of filtered grayscale values. The high pass filter may be implemented in any of a number of known ways. For example, the high pass filter may be constructed by removing predetermined low frequency components of the row of filtered grayscale values that are detected by a low pass (averaging) filter. Next, at step 225, a Fourier transform of the high pass filtered grayscale values is performed. Then, at step 230, the largest peak in the Fourier transform spectrum is identified, and a determination is made as to whether the peak appears at a frequency value that would indicate a series of perforations. If the answer at step 230 is yes, then, at step 235, a report may be provided indicating that a series of perforations has been detected. Conversely, if the answer at step 230 is no, then, at step 240, a report may be provided indicating that a series of perforations has not been detected. In either case, the information may be used as an indicator of the authenticity of the check in question.

Figure 3:
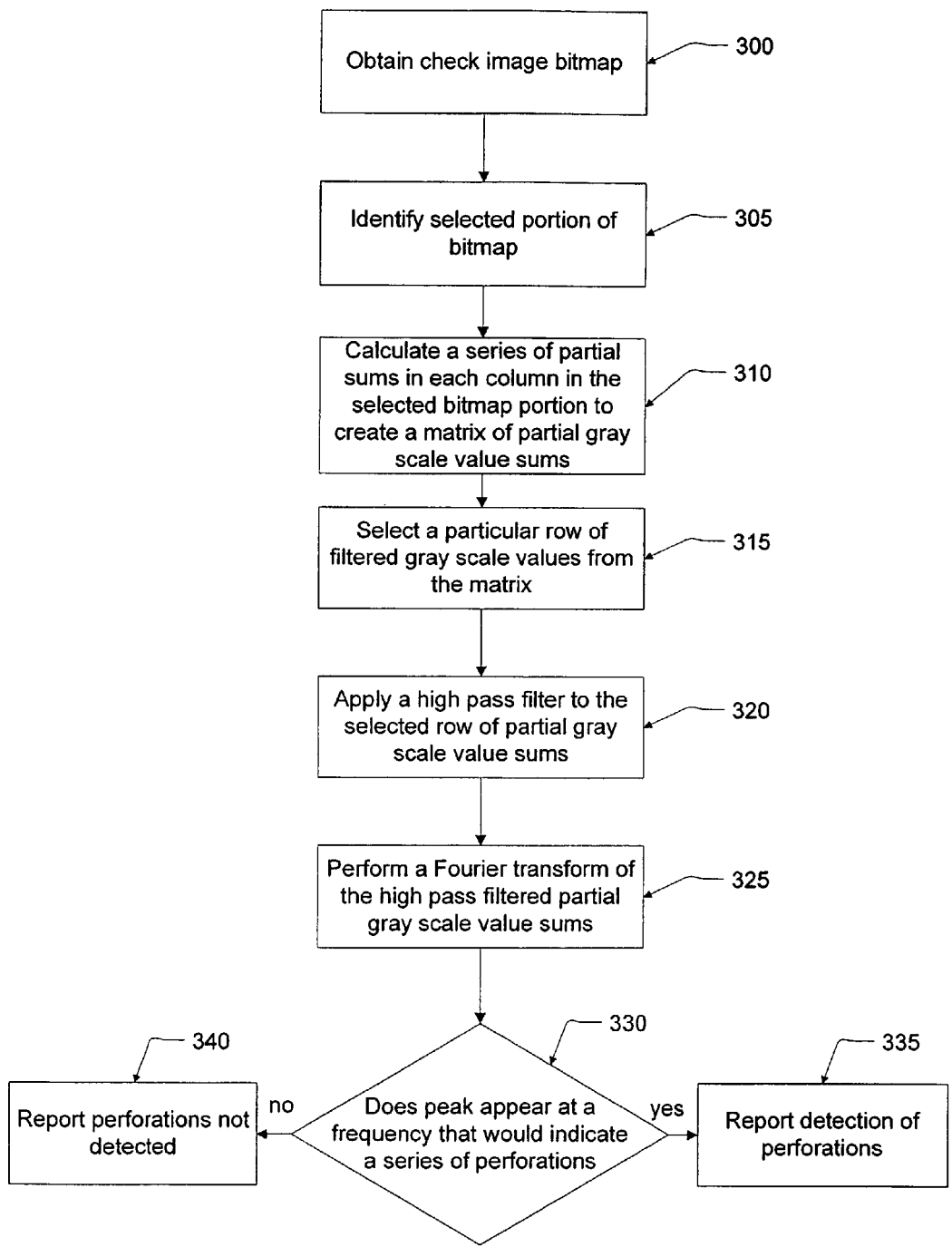
FIG. 3 is a flowchart of one particular embodiment of the method for detecting perforations on the edge of an image of a check shown in FIG. 2.

FIG. 3 is a flowchart of one particular embodiment of the method for detecting perforations on the edge of an image of a check shown in FIG. 2. In particular, in the embodiment of FIG. 3, the low pass filter is implemented by calculating a series of partial sums as described below.

The method of FIG. 3 begins at step 300, where the bitmap corresponding to an image of the check in question is obtained. At step 305, a selected portion of the bitmap is identified as described above. The portion selected in step 305 will consist of a sub-matrix of the rows and columns of pixel grayscale values in the image bitmap. Next, at step 310, a low pass filter is implemented by calculating a series of partial sums of the grayscale values in each column in the selected bitmap portion, thereby creating a matrix of partial grayscale value sums. Preferably, each of the partial sums for each column is created by calculating a weighted average of selected values in the column (e.g., partial sum 1 for column 1 equals the weighted average of the values of rows 1 and 2 of column 1, partial sum 2 for column 1 equals the weighted average of the values of rows 2 and 3 of column 1, and so on for each column). Then, at step 315, a particular row of the partial grayscale value sums from the matrix created in step 310 is selected. As was the case in FIG. 1, the row that is selected in step 315 is a row that is estimated to correspond closely to the top edge of the check, and may be chosen in a manner that is similar to that described in connection with FIGS. 1 and 2 (i.e., half way between top-most and bottom-most matrix rows determined to have maximum and minimum values, respectively). The particular row that is chosen may be determined based on experimentation using a number of bitmap images in any particular application.

At step 320, a high pass filter is applied to the selected row of partial grayscale value sums. As discussed above, the high pass filter may be implemented in any of a number of known ways. Next, at step 325, a Fourier transform of the high pass filtered partial grayscale value sums is performed. Then, at step 330, the largest peak in the Fourier transform spectrum is identified, and a determination is made as to whether the peak appears at a frequency value that would indicate a series of perforations. If the answer at step 330 is yes, then, at step 335, a report may be provided indicating that a series of perforations has been detected. Conversely, if the answer at step 330 is no, then, at step 340, a report may be provided indicating that a series of perforations has not been detected. In either case, the information may be used as an indicator of the authenticity of the check in question.

While preferred embodiments of the invention have been described and illustrated above, it should be understood that these are exemplary of the invention and are not to be considered as limiting. For example, the embodiments described herein have focused on the detection of perforations in a check, but it should be understood that the present invention may be used to detect perforations in other forms, such as lottery tickets or event tickets, in order to provide an indictor of the likely authenticity of the form. In addition, while the present invention has been described in connection with bitmaps represented by grayscale values, it should be understood that other brightness values may be used, such as, without limitation, binary brightness values (0=black, 1=white) describing a monochrome image. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method utilizing a computer for detecting whether perforations are present on the edge of an image of a form, comprising:
    obtaining a bitmap of said image; wherein said image has a black background
    utilizing said black background to identify a selected portion of said bitmap corresponding to at least said edge, said selected portion including a matrix of a plurality of rows and columns of brightness values;
    selecting a particular one of said rows of brightness values, by identifying a first row of pixels having a grayscale value generally equal to black and identifying a second row of pixels having a grayscale value corresponding to white so that said selected particular row is between said first row and said second row
    performing a transform of said brightness values included in said particular one of said rows of brightness values to generate a transformed output; and
    determining whether a series of perforations is present based on said transformed output.

2. The method according to claim 1, wherein said transform is a Fourier transform.

3. The method according to claim 2, wherein said determining step includes identifying a largest peak in said Fourier transform output and determining whether said largest peak corresponds to a perforation indicating frequency.

4. The method according to claim 1, wherein said selected portion of said bitmap comprises less than all of said bitmap.

5. The method according to claim 1, wherein said selected portion of said bitmap comprises all of said bitmap.

6. The method according to claim 5, wherein said particular one of said rows is estimated to correspond to said edge.

7. The method according to claim 5, wherein said form is a check.

8. A method utilizing a computer for detecting whether perforations are present on the edge of an image of a form, comprising:
    obtaining a bitmap of said image, which said image has a black background
    utilizing said black, background to identify a selected portion of said bitmap corresponding to at least said edge, said selected portion including a matrix of a plurality of rows and columns of brightness values;
    applying a low pass filter to each of said columns of brightness values to create a second matrix of a plurality of rows and columns of first filtered brightness values;
    selecting a particular one of said rows of first filtered brightness values
    applying a high pass filter to said particular one of said rows of first filtered brightness values to create a plurality of high pass filtered brightness values by identifying a first row of pixels having a grayscale value generally equal to black and identifying a second row of pixels having a grayscale value corresponding to white so that said second particular row is between said row and said second row;
    performing a transform of said high pass filtered brightness values to generate a transformed output; and
    determining whether a series of perforations is present based on said transformed output.

9. The method according to claim 8, wherein said transform is a Fourier transform.

10. The method according to claim 9, wherein said determining step includes identifying a largest peak in said Fourier transform output and determining whether said largest peak corresponds to a perforation indicating frequency.

11. The method according to claim 8, wherein said selected portion of said bitmap comprises less than all of said bitmap.

12. The method according to claim 8, wherein said selected portion of said bitmap comprises all of said bitmap.

13. The method according to claim 12, wherein said particular one of said rows is estimated to correspond to said edge.

14. The method according to claim 8, wherein said step of applying a low pass filter comprises calculating a plurality of partial sums for each of said columns of brightness values to create a plurality of partial brightness value sums, said partial brightness value sums being said first filtered brightness values.

15. The method according to claim 14, wherein each of said partial sums is a weighted average of particular ones of said brightness values.

16. The method according to claim 8, wherein said form is a check.

* * * * *